May 10, 1927.  H. C. LORD  1,627,789
RESILIENT WHEEL
Filed Feb. 19, 1921  2 Sheets-Sheet 1

Inventor.
Hugh C. Lord

Inventor.
Hugh C. Lord

Patented May 10, 1927.

1,627,789

UNITED STATES PATENT OFFICE.

HUGH C. LORD, OF ERIE, PENNSYLVANIA.

RESILIENT WHEEL.

Application filed February 19, 1921. Serial No. 446,244.

According to this invention a wheel is formed of two members, one associated with the hub and the other with the rim. These members are united by a yielding connection extending in an axial direction and suspending the one member with relation to the other by tension, or in a manner in which tension is the dominant factor. In this way one member may be suspended with relation to the other so as to be quite yielding in its initial movement and presenting a very rapidly increasing resistance toward the end of its movement. This gives a very much improved result in that it gives a very yielding effect when the load is normal and still prevents a displacement to the positive limit which must be provided under ordinary shocks. In carrying out my invention I preferably use rubber as a medium and make the connection in such dimensions relatively to the gap between the members as to make the stretch of the rubber as distinguished from mere lateral distortion or bending the dominant factor in resisting movement. To accomplish this the rubber in the form of a long thin strip may be wound up on securing rings engaging the edges of the rubber strip, the rubber being bound in place by metal tape as it is wound, the metal tape being wound under pressure with the rubber, thus binding the edges of the strip and leaving the intervening part free to stretch, one layer being slightly out of contact with another so as to avoid friction. When such a yielding connection is provided the front and back sides of the connection for the moment will present the rubber span edgewise and to this extent the connection will be subject to pronounced lateral distortion as well as stretch. In order to avoid this transverse slits may be formed in the connecting span of the rubber so as to make the connection a mass of small strands having very little lateral resistance but resisting the yielding movement of the wheel almost entirely through the stretch of the strands. With these strands arranged initially in an axial direction a displacement of one wheel member relatively to the other will change the angular relation of the strands so that there is not only the increased resistance to displacement through the stretching of the rubber but also a very pronounced increased resistance due to the angular relation of the strands to the direction of movement by which the displacement is accomplished.

The invention is illustrated in the accompanying drawings as follows:—

Figure 1:
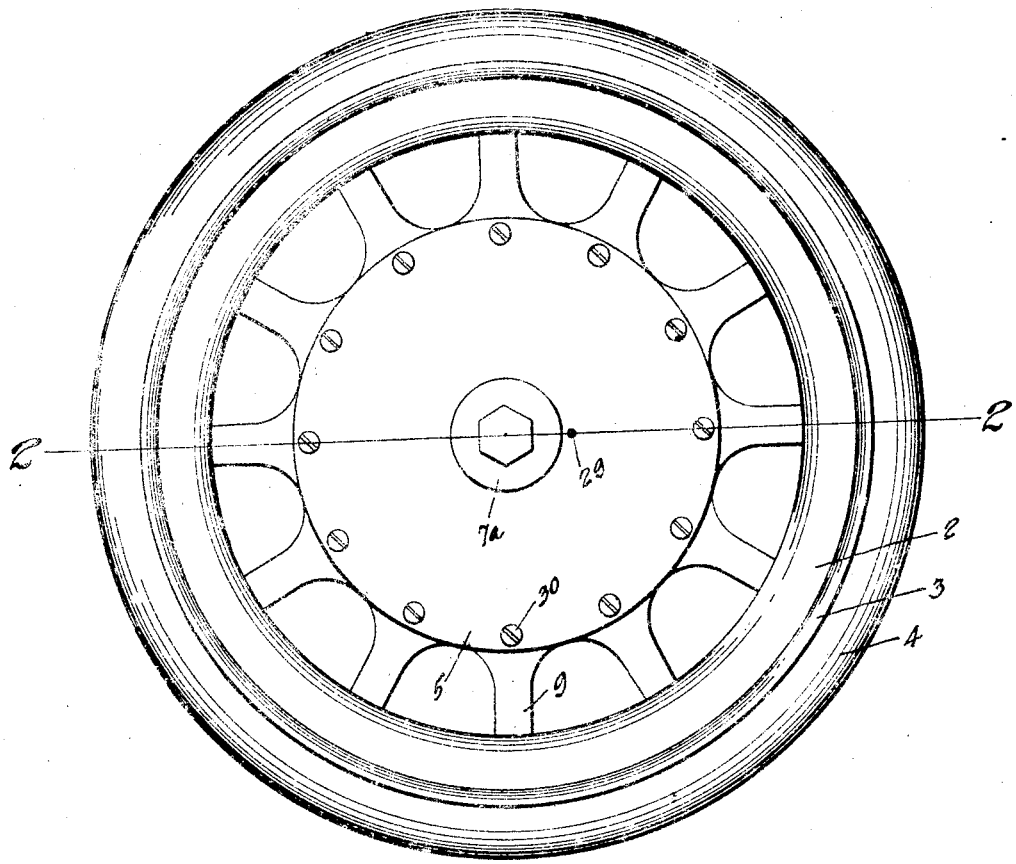
Figure 2:
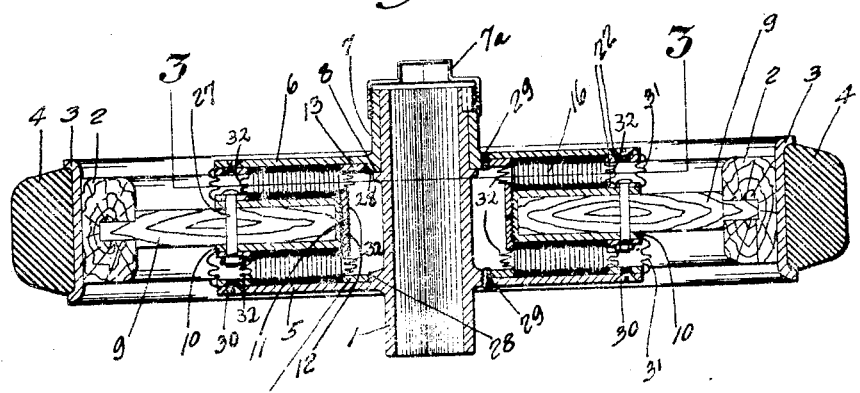
Figure 3:
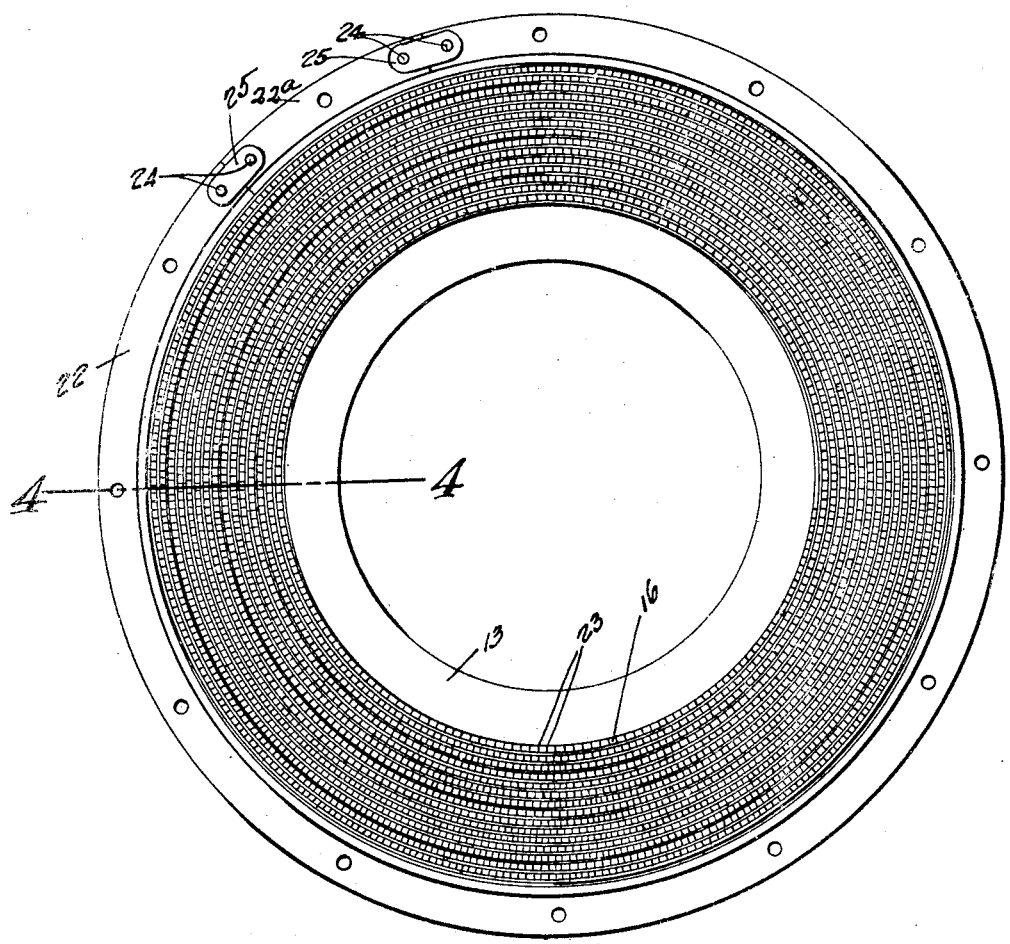
Figure 4:
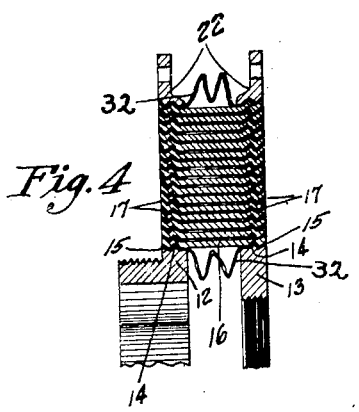
Figure 6:
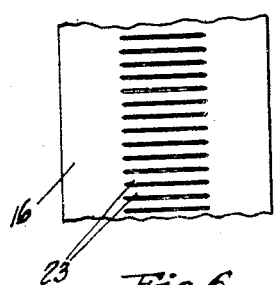
Figure 7:
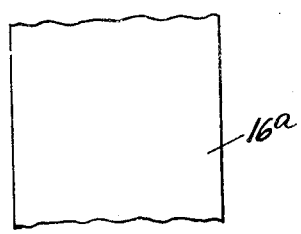
Figure 5:
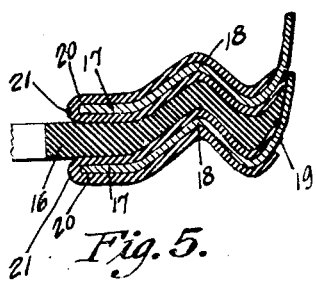

Fig. 1 shows a side elevation of the wheel.
Fig. 2 a section on the line 2—2 in Fig 1.
Fig. 3 an enlarged section on the line 3—3 in Fig. 2.
Fig. 4 a section on the line 4—4 in Fig. 3.
Fig. 5 an enlarged section of one of the layers of rubber with the binding bands.
Fig. 6 a plan view of a preferred form of rubber strip.
Fig. 7 an alternative construction of rubber strip.

1 marks the hub, 2 the felloe, 3 the rim, and 4 a tire which may be either solid or pneumatic. As shown it is solid. The hub has a radially extending flange 5 at one side of the wheel and a radially extending flange 6 at the opposite side of the wheel, the flange 6 extending from a sleeve 7 which is arranged on the hub and abuts against a shoulder 8 limiting its axial movement. Any convenient form of bearing (not shown) may be supplied. A cap 7ª is formed on the sleeve 7 closing the end of the hub.

Spokes 9 are secured in the felloe in the usual manner and the inner ends are driven into an annular channel 10. The bottom 11 of the channel is screw-threaded at its inner periphery.

Inner supporting rings 12 and 13 are provided on which the connection is wound. The rings 12 and 13 have the V-shaped ribs 14 and the outer annular lips 15. A rubber strip 16 is wound on the rings 12 and as wound is bound by the metal tapes 17, these tapes having the V-shaped center 18 conforming to the ribs 14 and the outer shoulders 19 following the lips 15, the outer edges of the shoulders 19 contacting with the next succeeding wrap of the tape so as to laterally support one layer with another. The strip of rubber with the tape so formed is wound up with the tapes under sufficient pressure to hold the spans of rubber as they are subjected to strain and the thickness of the tape or binding portions is sufficient to maintain the layers of rubber out of contact and with just sufficient space to accomplish this purpose. Ordinarily the rubber tapes are wound off the reel (not shown) having sufficient resistance to give the tension desired and the tapes are carried over the edges of the rubber by any suitable means, such as an ordinary folding attachment for a hemming machine (not shown) and in a continuous operation. The strips are rubber ordinarily wound from a reel and in actual practice are slitted as they are fed to the position of winding into the wheel but this may be done in advance. Further the tapes may be put on in advance and the cushioning strips may be put on in advance, the manner of assembling these parts up to the point of winding being carried out by any desirable handling means. A cushioning or wear strip 20 is preferably afforded over the binding tapes 17 with the fold at 21 protecting the rubber from the cutting action of the tape. After the winding is completed the securing rings 22 are compressed and clamped on the outer wrap of the tape, the securing rings 22 conforming on their inner peripheries to the shape of the tapes so as to engage them. The rings are preferably separated at one point and a small insert 22ª provided and the ends are secured by straps 25 placed over the pins 24.

The steel tapes should be wide enough with relation to the strain carried by the rubber to maintain their position against lateral displacement and to assist in this the ribs interlock and the shoulders 19 engage succeeding wraps. The material is clamped by the rings to facilitate this but if the number of wraps is increased the tapes should be widened correspondingly so as to maintain the rigidity of the sides of the resilient connection.

The rings 12 extend inwardly from the wrapped portion and the outer periphery of each extension is screw-threaded. These rings are screwed into the connecting wall 11 of the channel 10. Bolts 27 are passed through the rings 22 at the inside of the connection and these clamp the rings against the sides of the channel 10 and also tend to clamp the channels against the spokes. The outside inner rings 13 are screw-threaded on their inner periphery and screwed on to the screw-threaded shoulders 28 on the inner faces of the flanges 5 and 6. The shoulder 8 may be so distanced from the flange 5 that the threads on the shoulders 28 will, when the rubber connection is slack, just enter the threads on the rings 13 so that with the continued screwing up of the rings by turning the flange 6 the rings 13 are separated, thus placing the spans of rubber in the connection under initial tension. As the rings 13 are brought to place against the flanges 5 and 6 they are locked in place by screws 29. The rings 22 at the outside of the connection are clamped to the inner faces of the flanges 5 and 6 by means of screws 30 which extend through the flanges into the rings 22, the rings 22 having screw-threaded perforations for this purpose and the flanges having openings to receive the screws.

It will be observed that the resulting connection is formed with a scroll of rubber of comparatively small cross section radially as compared to the space spanned. Any pressure on the rib member of the wheel which displaces the channel with relation to the flanges deflects the spans of rubber. If this displacement is vertical the parts of the bands for the moment at the top and bottom are deflected to an angle to the surfaces of the bands and the lateral distortion or bending of the rubber in these parts of the periphery takes place in a very thin portion so that the resistance to this vertical displacement in this portion of the circle is almost entirely incident to the resistance of the stretch of the rubber as distinguished from lateral bending. At the parts of the bands for the moment at the front and back of the connection, however, the rubber is displaced edgewise and if the rubber strip is solid there is a certain amount of resistance to this displacement of a nature corresponding to lateral bending. This not only puts the rubber under added strain but the variation in resistance as the displacement continues does not follow the same law as where the resistance due to lateral bending is practically eliminated as at the top and bottom. I prefer, therefore, to form the rubber strips with transverse slits extending across the yielding span and to form the bars 23 between the slits of approximately the same width as the thickness of the rubber strip so that the bars will have equal cross dimensions radially and circumferentially. In this way all parts of the connection in all parts of the revolution resist the displacement of one wheel member relatively to the other through tension or lengthwise stretching of the spans as distinguished from resistance incident to lateral bending. The resistance incident to lateral bending is thus made nearly negligible.

In order to strengthen the points of greatest strain, namely, along the binding edges I prefer to terminate the bars 23 adjacent to but slightly removed from the inner edges of the binding tapes leaving a continuous strip of rubber along the outer edges of the bars so as to re-enforce them, or make the bend at the point of securing the bars less abrupt. Further the bending of the rubber for the moment at the top and bottom of the yielding connection will be approximately over the edge of the binding tapes. The continuous strip of rubber at the edges of the strands at the front and rear of the wheel, that is to say, when extending vertically, presents considerable stiffness as the strip is approximately in a vertical plane, or plane in the direction of strain. Therefore the bending will largely take place in the strands themselves adjacent to the ends of the strands so that the bending action which takes place in the revolution of the wheel under load is distributed and thus the life of the connection increased. It will be understood that the strands or bars 23 are out of contact circumferentially. These bars may be formed in any convenient manner, during vulcanization, or subsequent thereto. One convenient method of forming the bars is to slit the ribbon of rubber after it is vulcanized, the slits being preferably a distance apart equal to the thickness of the rubber. By stretching the rubber band as a whole very slightly as it is wound the slits between the bars are opened and this may be controlled by the amount of stretch. A very slight stretch is sufficient to carry the bars out of engagement. With the connection thus constructed the friction is almost entirely confined to the inherent or internal friction of the rubber and this is negligible. A protecting band 31 of bellows shape is clamped between the rings 22 and the flanges and annular channel, thus closing the annular space and protecting the outer layer of rubber and at the same time forming a more perfect joint between the rings and the flanges and channel.

I prefer to enclose the operating part of the connection in air-tight sealing bands 32. The inner one can be run on the bearings 12 and 13 and the ends sealed prior to running on the rubber and bands and the outer one is put in place prior to the clamping down of the rings 22. The space occupied by the insert 22ᵃ affords means for securing or holding the end of the metal tape while the ring 22 is being clamped in place preferably by a clamp having a plurality of radially closing jaws. After this part of the clamp is set the ends of the metal tapes may be put in place with the strips 20 providing a sealing base and the ends of the sealing strip 32 brought together and closed. The insert 22ᵃ is then clamped in place and the plates 25 can then be slipped in place locking the whole in position. With these sealing strips there is afforded an air-tight seal for the connection and thus the space occupied by the multitude of strands may be filled with an inert gas, for example, nitrogen, so as to retard the deterioration of the rubber.

While I have shown a comparative thickness of rubber strip which may be used, it will be understood that the thinner the strip and the smaller the strands the less distress is given to the rubber at the bending points. The comparative thickness, therefore, is one of expediency except that these strands are minute as compared with any device of this character with which I am acquainted. As the bands are made thinner a greater number of wraps is required and consequently a greater amount of tape. In a preferable installation, however, these strands at each side of the element of an ordinary wheel such as used in an automobile would run into thousands.

In Fig. 6 I have shown the rubber strip as slitted and the slits open and in Fig. 7 a solid ribbon 16ᵃ.

What I claim as new is:—

1. In a wheel, the combination of a hub member; a rim member, said members having radially overlapping portions spaced apart; and an elastic rubber connection extending axially between said members having strands, all cross dimensions of the strands being less than the space between the members.

2. In a wheel, the combination of a hub member; a rim member, said members having radially overlapping portions spaced apart; and a laminated connection between the members resisting a relative radial movement of the members through resistance to the stretch of the connection the intermediate portions of the laminations being disconnected.

3. In a wheel, the combination of a hub member; a rim member, said members having radially overlapping portions spaced apart; and a laminated connection between the members, the resistance of the connection to stretch being the dominant resistance to relative radial movement of the members.

4. In a wheel, the combination of a hub member; a rim member, said members having radially overlapping portions spaced apart; and a laminated connection between the members resisting a relative radial movement of the members through resistance to the stretch of the connection, said laminations being out of contact.

5. In a wheel, the combination of a hub member; a rim member, said members having radially overlapping portions spaced apart; and a laminated connection between the members, said laminations being annular and resisting relative radial movement of the members through resistance to stretch of the connection the intermediate portions of the laminations being disconnected.

6. In a wheel, the combination of a hub member; a rim member, said members having radially overlapping portions spaced apart; and a laminated connection between the members, said laminations being annular and resisting relative radial movement of the members through resistance to stretch of the connection, said laminations being out of contact.

7. In a wheel, the combination of a hub member; a rim member, said members having radially overlapping portions spaced apart; and a laminated connection between the members, said laminations being annular and the resistance of the connection to stretch being the dominant resistance to relative movement of the members.

8. In a wheel, the combination of a hub member; a rim member, said members having radially overlapping portions spaced apart; and a resilient axially extending rubber tension connection between the wheel members, said connection being subjected to tension with the initial movement of the wheel members, said connection being formed of a plurality of tension strands thinner than the space between the wheel members.

9. In a wheel, the combination of a hub member; a rim member, said members having radially overlapping portions spaced apart; and a resilient axially extending rubber tension connection between the wheel members, said connection being subjected to tension with the initial movement of the wheel members, said connection being formed of a plurality of tension strands thinner than the space between the wheel members, said elements being out of contact.

10. In a wheel, the combination of a hub member; a rim member, said members having radially overlapping portions spaced apart; and a resilient axially extending tension connection between the wheel members, said connection being subjected to tension with the initial movement of the wheel members, said connection being formed of a plurality of rubber tension strands, each cross dimension of the strands being less than the space between the members.

11. In a wheel, the combination of a hub member; a rim member, said members having radially overlapping portions spaced apart; and a resilient axially extending tension connection between the wheel members, said connection being subjected to tension with the initial movement of the wheel members, said connection being formed of a plurality of rubber tension strands, each cross dimension of the strands being less than the space between the members and said strands being out of contact.

12. In a wheel, the combination of a hub member; a rim member, said members having radially overlapping portions spaced apart; and a resilient connection between the members, said connection being formed of a plurality of resilient strands integrally united at their ends.

13. In a wheel, the combination of a hub member; a rim member, said members having radially overlapping portions spaced apart; and a resilient connection between the members, said connection being formed of a plurality of resilient strands integrally united at their ends, the middle portions of the strands being out of contact.

14. In a wheel, the combination of a hub member; a rim member, said members having radially overlapping portions spaced apart; and a connection between the members made up of annular layers of rubber and non-elastic bands binding the rubber at the edges.

15. In a wheel, the combination of a hub member; a rim member, said members having radially overlapping portions spaced apart; and a connection between the members made up of annular layers of rubber and non-elastic bands binding the rubber at the edges, said layers being out of contact.

16. In a wheel, the combination of a hub member; a rim member, said members having radially overlapping portions spaced apart; and a connection between the members made up of annular layers of rubber and non-elastic bands binding the rubber at the edges, said bands having locking ribs.

17. In a wheel, the combination of a hub member; a rim member, said members having radially overlapping portions spaced apart; and a connection between the members made up of annular layers of rubber and non-elastic bands binding the rubber at the edges, said bands having locking parts in direct contact.

18. In a wheel, the combination of a hub member; a rim member, said members having radially overlapping portions spaced apart; and a connection between the members made up of annular layers of rubber and non-elastic bands binding the rubber at the edges, said bands having locking ribs intermediate their edges and shoulders at the outer edges in direct contact.

19. In a wheel, the combination of a hub member; a rim member, said members having radially overlapping portions spaced apart; and a connection between the members made up of annular layers of rubber with transverse slits forming tension bars and non-elastic bands binding the layers of rubber at the edges.

20. In a wheel, the combination of a hub member; a rim member, said members having radially overlapping portions spaced apart; and a connection between the members made up of annular layers of rubber with transverse slits forming tension bars of equal cross dimensions and non-elastic bands binding the layers of rubber at the edges.

21. In a wheel, the combination of a hub member; a rim member, said members having radially overlapping portions spaced apart; and a connection between the members made up of annular layers of rubber with transverse slits forming tension bars and non-elastic bands binding the layers of rubber at the edges, said bars being out of contact.

22. In a wheel, the combination of a hub member; a rim member, said members having radially overlapping portions spaced apart; and a connection between the members made up of annular layers of rubber with transverse slits forming tension bars and non-elastic bands binding the layers of rubber at the edges, the slits terminating adjacent to but outside the bands.

23. In a wheel, the combination of a hub member; a rim member, said members having radially overlapping portions spaced apart; and a connection between the members made up of a plurality of strands secured to the members and having the intermediate portions out of contact, said strands being re-enforced adjacent to their ends.

24. In a wheel, the combination of a hub member; a rim member, said members having radially overlapping portions spaced apart; a connection between the members made up of annular layers of rubber and metal bands binding the rubber at the edges; and strips between the bands and rubber layers.

25. In a wheel, the combination of a hub member; a rim member, said members having radially overlapping portions spaced apart; a connection between the members made up of annular layers of rubber and metal bands binding the rubber at the edges; and strips between the bands and rubber layers, said strips extending beyond the inner edges of the bands.

26. In a wheel, the combination of a hub member; a rim member, said members having radially overlapping portions spaced apart; a connection between the members made up of annular layers of rubber and metal bands binding the rubber at the edges; and strips between the bands and rubber layers, said strips extending around the inner edges of the bands.

27. In a wheel, the combination of a hub member; a rim member, said members having radially overlapping portions spaced apart; a connection between said members formed of annular layers of rubber; securing rings on which the layers of rubber are formed; non-elastic bands binding the edges of the rubber on the inner securing rings; and outer securing rings clamped on the outer edges of the connection.

28. In a wheel, the combination of a hub member; a rim member, said members having radially overlapping portions spaced apart; and a connection between the members formed of a strip of rubber wound up and bound at the edges by bands alternating with the layers of rubber.

29. In a wheel, the combination of a hub member; a rim member, said members having radially overlapping portions spaced apart; and a connection between the members formed of a strip of rubber wound up and bound at the edges by bands alternating with the layers of rubber, the convolutions of rubber being out of contact.

30. In a wheel, the combination of a hub member; a rim member, said members having radially overlapping portions spaced apart; and a connection between the members formed of a strip of rubber wound up and bound at the edges by bands alternating with the layers of rubber, the bands having locking ribs.

31. In a wheel, the combination of a hub member; a rim member, said members having radially overlapping portions spaced apart; and a connection between the members formed of a strip of rubber wound up and bound at the edges by bands alternating with the layers of rubber, the bands having locking parts in direct contact.

32. In a wheel, the combination of a hub member; a rim member, said members having radially overlapping portions spaced apart; and a connection between the members formed of a strip of rubber wound up and bound at the edges by bands alternating with the layers of rubber, each band having a locking rib intermediate its edges and a shoulder at one edge, the shoulder on one convolution contacting with a succeeding convolution of the band.

33. In a wheel, the combination of a hub member; a rim member, said members having radially overlapping portions spaced apart; and a connection between the members formed of a strip of rubber wound up and bound at the edges by bands alternating with the layers of rubber, said strip of rubber having slits forming tension bars.

34. In a wheel, the combination of a hub member; a rim member, said members having radially overlapping portions spaced apart; a connection between the members, said connection being formed of rubber wound on inner securing rings; bands arranged at the edges of the rubber and bound into the structure with the rubber; and securing means at the outer peripheries of the assembled bands.

35. In a wheel, the combination of a hub member; a rim member, said members having radially overlapping portions spaced apart; a connection between the members, said connection being formed of rubber wound on inner securing rings; bands arranged at the edges of the rubber and bound into the structure with the rubber; and securing means at the outer peripheries of the assembled bands in the form of clamping rings adapted to secure the connection to the wheel members.

36. In a wheel, the combination of a hub member; a rim member, said members having radially overlapping portions spaced apart; and a connection between the members formed of a strip of rubber wound around the axis of the wheel a plurality of times and bound at the edges by bands alternating with the layers of rubber.

37. In a wheel, the combination of a hub member; a rim member, said members having radially overlapping portions spaced apart; and a connection between the members formed of a strip of rubber wound around the axis of the wheel and bound at the edges by bands alternating with the layers of rubber, the strip having slits forming tension bars.

38. In a wheel, the combination of a hub member having radially extending flanges with screw-threaded projections thereon; a rim member having an annular plate arranged between the flanges, the inner periphery of the plate being screw-threaded; a connection between the members comprising rings spaced apart, the outside rings being screwed on to the shoulders on the flanges and the inside rings being screwed into the annular plate; a rubber strip wound on to each cooperative pair of said rings; binding tapes clamping the rubber strip on the rings; clamping rings on the outer periphery of the wound rubber and tapes; and means for securing said outer rings to the flanges and annular plate.

39. In a wheel, the combination of a hub member; a rim member, said members having radially overlapping portions spaced apart; an elastic rubber connection extending axially between said members, one cross dimension of the connection being less than the distance between the members; and means for putting the connection under initial tension.

40. In a wheel, the combination of a hub member; a rim member, said members having radially overlapping portions spaced apart; a connection with its layers superimposed radially between the members resisting a relative radial movement of the members through resistance to the stretch of the connection; and means for putting the connection under initial tension.

41. In a wheel, the combination of a hub member; a rim member, said members having radially overlapping portions spaced apart; a resilient axially extending tension connection between the wheel members, said connection being subjected to tension with the initial movement of the wheel members, said connection being formed of a plurality of tension strands, each cross dimension of the strands being less than the space between the members; and means for putting the connection under initial tension.

42. In a wheel, the combination of a hub member; a rim member, said members having radially overlapping portions spaced apart; a connection between the members made up of annular layers of rubber and non-elastic bands binding the rubber at the edges; and means for putting the connection under initial tension.

43. In a wheel, the combination of a hub member; a rim member, said members having radially overlapping parts; a resilient rubber connection extending axially between said members; and a flexible strip arranged between said members to protect said resilient connection.

44. In a wheel, the combination of a hub member; a rim member, said members having overlapping parts; an axially extending resilient connection between said members; and an air-tight seal enclosing the resilient connection.

45. In a wheel, the combination of a hub member; a rim member, said members having overlapping parts; a resilient rubber connection between said members; an air-tight seal enclosing the resilient connection; and a gas more inert as to rubber than air within the seal.

In testimony whereof I have hereunto set my hand.

HUGH C. LORD.